(12) United States Patent
Sugawara et al.

(10) Patent No.: US 12,180,660 B2
(45) Date of Patent: Dec. 31, 2024

(54) DEGRADATION DISPLAY SYSTEM, DEGRADATION DISPLAY METHOD, AND RECORDING MEDIUM

(71) Applicant: NEC Corporation, Tokyo (JP)

(72) Inventors: Chisato Sugawara, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 17/910,422

(22) PCT Filed: Mar. 5, 2021

(86) PCT No.: PCT/JP2021/008766
§ 371 (c)(1),
(2) Date: Sep. 9, 2022

(87) PCT Pub. No.: WO2021/199915
PCT Pub. Date: Oct. 7, 2021

(65) Prior Publication Data
US 2023/0135343 A1    May 4, 2023

(30) Foreign Application Priority Data
Mar. 31, 2020  (JP) ................. 2020-062916

(51) Int. Cl.
*G01B 5/28*       (2006.01)
*E01C 23/01*     (2006.01)
(Continued)

(52) U.S. Cl.
CPC ............ *E01C 23/01* (2013.01); *G01B 5/28* (2013.01); *G06T 7/55* (2017.01); *G06T 7/62* (2017.01);
(Continued)

(58) Field of Classification Search
CPC .. E01C 23/01; G01B 5/28; G06T 7/55; G06T 7/62; G06T 11/60; G08G 1/0129;
(Continued)

(56) References Cited

U.S. PATENT DOCUMENTS

2005/0031169 A1*  2/2005  Shulman .............. G06F 16/51
                                                                      382/104
2018/0195973 A1   7/2018  Yonekawa et al.
(Continued)

FOREIGN PATENT DOCUMENTS

| JP | 2010-060718 A | 3/2010 |
|----|---------------|--------|
| JP | 2015-225234 A | 12/2015 |
| JP | 2018-087484 A | 6/2018 |

OTHER PUBLICATIONS

International Search Report for PCT Application No. PCT/JP2021/008766, mailed on May 18, 2021.
(Continued)

*Primary Examiner* — David J Bolduc
(74) *Attorney, Agent, or Firm* — Sughrue Mion, PLLC

(57) ABSTRACT

A degradation display system according to an aspect of the present disclosure includes: at least one memory configured to store instructions, and at least one processor configured to execute the instructions to perform: acquiring a degradation index indicating a degradation state of a road section, changing display form of a map in accordance with a display range and a scale of the map, and superimposing degradation information on the map, the degradation information based on the degradation index of an area on the map or the road section in the area, wherein the superimposing includes: superimposing, for each area, the degradation information in a display form corresponding to a degree of the degradation index of the area in a case that the map is at a first scale, and superimposing, for each road section, the degradation information in a display form corresponding to a degree of the
(Continued)

degradation index of the road section in a case that the map is at a second scale larger than the first scale.

13 Claims, 17 Drawing Sheets

(51) Int. Cl.
    *G06T 7/55*     (2017.01)
    *G06T 7/62*     (2017.01)
    *G08G 1/01*     (2006.01)

(52) U.S. Cl.
    CPC ......... *G08G 1/0129* (2013.01); *G08G 1/0112* (2013.01); *G08G 1/012* (2013.01)

(58) Field of Classification Search
    CPC .. G08G 1/0112; G08G 1/012; G01C 21/3697; G01C 21/367
    See application file for complete search history.

(56) References Cited

U.S. PATENT DOCUMENTS

2018/0300867 A1* 10/2018 Nonaka ............... G01M 5/0033
2021/0063196 A1* 3/2021 Kimura .................. G06T 11/206
2021/0064891 A1* 3/2021 Kimura ..................... G06F 3/14

OTHER PUBLICATIONS

English translation of Written opinion for PCT Application No. PCT/JP2021/008766, mailed on May 18, 2021.

Shigeyuki Murakami et al., "Achievement of efficient maintenance and management of social infrastructure", FUJITSU, Nov. 10, 2013, vol. 64, No. 6, pp. 630-637.

\* cited by examiner

Fig.3

| ROAD SECTION ID | SECTION POSITION | INSPECTION DATE AND TIME | DEGRADATION DEGREE | | |
| --- | --- | --- | --- | --- | --- |
| | | | CRACK RATIO (%) | RUTTING AMOUNT (mm) | IRI (mm/m) |
| ⋮ | ⋮ | ⋮ | ⋮ | ⋮ | ⋮ |
| R300-3 | 35.*, 139.* | 2012/3/11 11:00 | 25 | 20 | 3.3 |
| R300-3 | 35.*, 139.* | 2016/3/7 12:01 | 28 | 25 | 4.4 |
| R300-3 | 35.*, 139.* | 2020/3/1 10:02 | 33 | 35 | 5.4 |
| ⋮ | ⋮ | ⋮ | ⋮ | ⋮ | ⋮ |

| DEGRADATION DEGREE LEVEL | DEGRADATION DEGREE (CRACK RATIO (%)) |
|---|---|
| 1: DEGRADATION LOW | C < 20 |
| 2: DEGRADATION MEDIUM | 20 ≤ C < 40 |
| 3: DEGRADATION HIGH | 40 ≤ C |

Fig.7

| DEGRADATION RATE LEVEL | DEGRADATION RATE (Δ CRACK RATIO / ΔT) |
|---|---|
| 1: LOW | V < 0.5 |
| 2: MEDIUM | 0.5 ≤ V < 1.25 |
| 3: HIGH | 1.25 ≤ V |

Fig.8

| RELIABILITY LEVEL | RELIABILITY (%) |
|---|---|
| 1: HIGH | 70 < R ≤ 100 |
| 2: MEDIUM | 30 < R ≤ 70 |
| 3: LOW | 0 < R ≤ 30 |

Fig.9

| ROAD SECTION ID | POSITION INFORMATION | DEGRADATION DEGREE (%) | DEGRADATION RATE (Δ%/ΔT) | RELIABILITY (%) | INSPECTION DATE AND TIME | URGENCY |
|---|---|---|---|---|---|---|
| R100-1 | 35.*, 139.* | 10 | 0.6 | 80 | 2019/3/1 10:00 | - |
| R100-2 | 35.*, 139.* | 43 | 1.0 | 80 | 2019/3/1 10:01 | - |
| R100-3 | 35.*, 139.* | 33 | 1.20 | 80 | 2019/3/1 10:02 | - |
| ⋮ | ⋮ | ⋮ | ⋮ | ⋮ | ⋮ | ⋮ |
| R200-1 | 35.*, 139.* | 22 | 0.3 | 50 | 2020/2/2 10:00 | - |
| R200-2 | 35.*, 139.* | ⋮ | ⋮ | ⋮ | 2020/2/2 10:01 | POT HOLE |
| ⋮ | ⋮ | ⋮ | ⋮ | ⋮ | ⋮ | ⋮ |
| R500-3 | 35.*, 139.* | ⋮ | ⋮ | ⋮ | 2019/5/1 10:00 | POT HOLE |
| ⋮ | ⋮ | ⋮ | ⋮ | ⋮ | ⋮ | ⋮ |

DEGRADATION DISPLAY SYSTEM, DEGRADATION DISPLAY METHOD, AND RECORDING MEDIUM

This application is a National Stage Entry of PCT/JP2021/008766 filed on Mar. 5, 2021, which claims priority from Japanese Patent Application 2020-062916 filed on Mar. 31, 2020, the contents of all of which are incorporated herein by reference, in their entirety.

TECHNICAL FIELD

The present disclosure relates to a degradation display system and the like that display degradation of a road.

BACKGROUND ART

A road degradation diagnosis system based on data obtained from an imaging device and a measurement device outputs a road diagnosis result over a wide region managed by a road manager. PTL 1 describes an example of detecting a crack of a road using a captured image of the road and calculating a crack ratio.

CITATION LIST

Patent Literature

[PTL 1] JP 2018-087484A

SUMMARY OF INVENTION

Technical Problem

The road manager needs to preferentially select important information from a large number of degradation diagnosis results obtained in the managed region. For example, it is difficult to grasp information necessary for inspection or repair of a road in a complex manner simply by visualizing degradation diagnosis. Therefore, there is a demand for display in which necessary information is reflected on a screen and that is easy to understand.

In order to solve the above problem, an object of the present disclosure is to provide a degradation display system and the like capable of displaying degradation information indicating a degradation state of a road in accordance with a display range of a map.

Solution to Problem

A degradation display system according to an aspect of the present disclosure includes: an acquisition unit that acquires a degradation index indicating a degradation state of a road section; and a display control means configured to change display of a map in accordance with a display range and a scale of the map, and superpose and display degradation information based on the degradation index of an area on the map or the road section in the area, in which the display control unit superposes and displays, for each area, the degradation information based on the degradation index in a display form corresponding to a degree of the degradation index of the area when the scale of the map is small, and superposes and displays, for each road section, the degradation information based on the degradation index in a display form corresponding to a degree of the degradation index of the road section when the scale of the map is large.

A degradation display method according to an aspect of the present disclosure includes: acquiring a degradation index indicating a degradation state of a road section; changing display of a map in accordance with a display range and a scale of the map, and superposing and displaying degradation information based on the degradation index of an area on the map or the road section in the area; superposing and displaying, for each area, the degradation information based on the degradation index in a display form corresponding to a degree of the degradation index of the area when the scale of the map is small; and superposing and displaying, for each road section, the degradation information based on the degradation index in a display form corresponding to a degree of the degradation index of the road section when the scale of the map is large.

A program according to an aspect of the present disclosure causes a computer to perform: acquiring a degradation index indicating a degradation state of a road section; changing display of a map in accordance with a display range and a scale of the map, and superposing and displaying degradation information based on the degradation index of an area on the map or the road section in the area; superposing and displaying, for each area, the degradation information based on the degradation index in a display form corresponding to a degree of the degradation index of the area when the scale of the map is small; and superposing and displaying, for each road section, the degradation information based on the degradation index in a display form corresponding to a degree of the degradation index of the road section when the scale of the map is large.

Advantageous Effects of Invention

According to the present disclosure, degradation information indicating a degradation state of a road is displayed in accordance with a display range of a map.

BRIEF DESCRIPTION OF DRAWINGS

FIG. 3 is a diagram illustrating a degradation degree history table for road sections.

FIG. 7 is a table illustrating an example of degradation rate levels of degradation rates.

FIG. 8 is a table illustrating an example of reliability levels of reliability.

FIG. 9 is a table illustrating a part of road inspection data on road sections included in an area.

EXAMPLE EMBODIMENTS

First Example Embodiment

Figure 1:
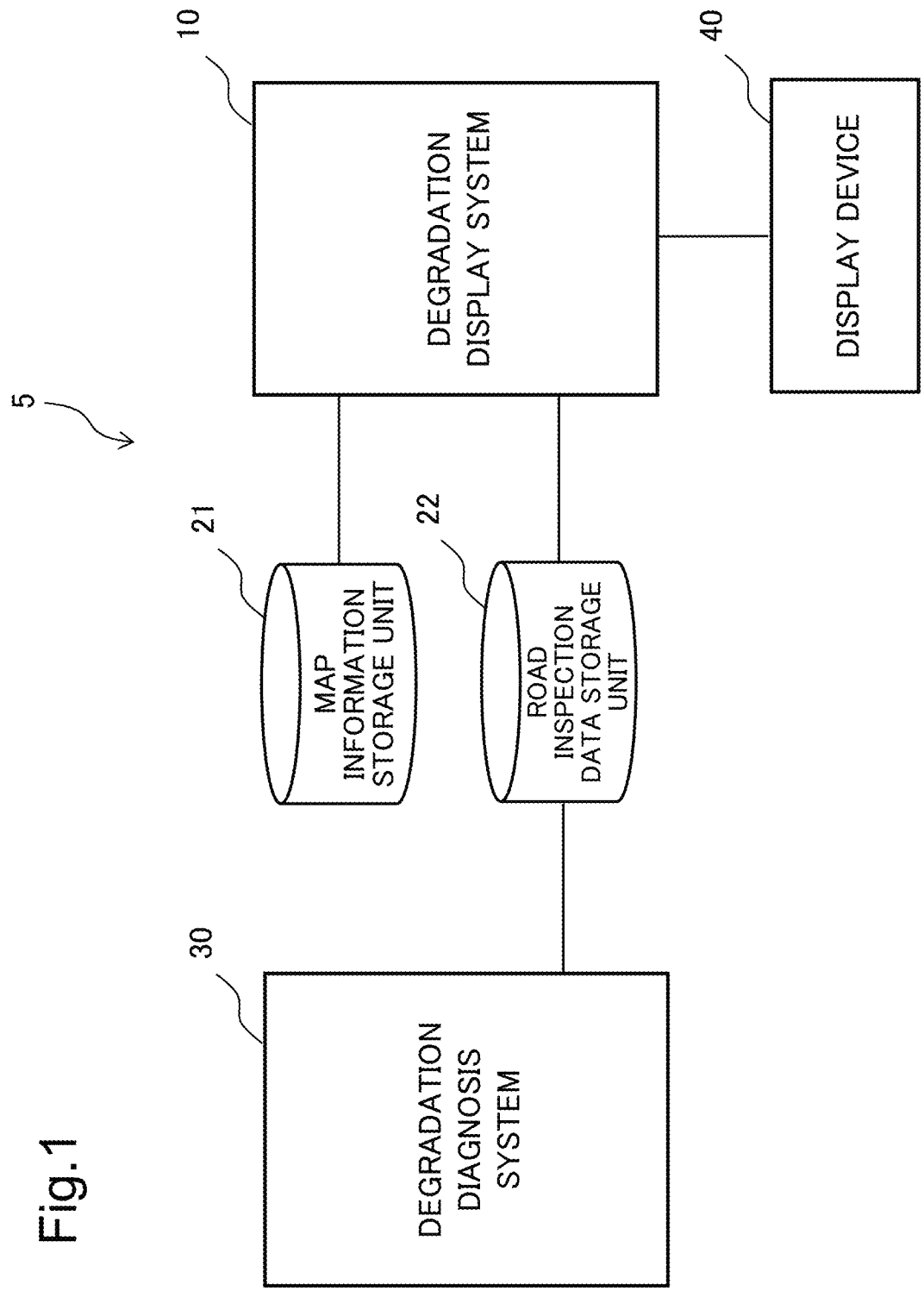
FIG. 1 is a block diagram illustrating an example of a road management system.

An aspect of a degradation display system according to a first example embodiment will be described. FIG. 1 is a block diagram illustrating an example of a road management system including the degradation display system according to the first example embodiment. A road management system 5 illustrated in FIG. 1 includes a degradation display system 10, a map information storage unit 21, a road inspection data storage unit 22, and a degradation diagnosis system 30.

The degradation display system 10 is a system that supports a road manager who plans inspection, repair, and the like of a road. The degradation display system 10 refers to inspection data on the road stored in the road inspection data storage unit 22, and displays a degradation index of the road in accordance with a display range of a map on the basis of the inspection data, thereby supporting the road manager to formulate a road inspection or repair plan. Details of the degradation display system 10 will be described later.

The map information storage unit 21 stores map information including roads managed by the road manager. The road inspection data storage unit 22 stores inspection data in which a degradation state of a road is registered. The map information storage unit 21 and the road inspection data storage unit 22 each include, for example, a storage device such as a magnetic hard disk.

The degradation diagnosis system 30 diagnoses a degradation state of a road at a measurement point on the basis of data obtained from an imaging device and a measurement device. A road section includes a plurality of measurement points. After an inspection is performed, the inspection data indicating the degradation state of the road is added to or updated and registered in the road inspection data storage unit 22 in association with the road section.

A display device 40 displays screen data output from the degradation display system 10. The display device 40 is, for example, a liquid crystal display.

<Degradation Diagnosis System>

Figure 2:
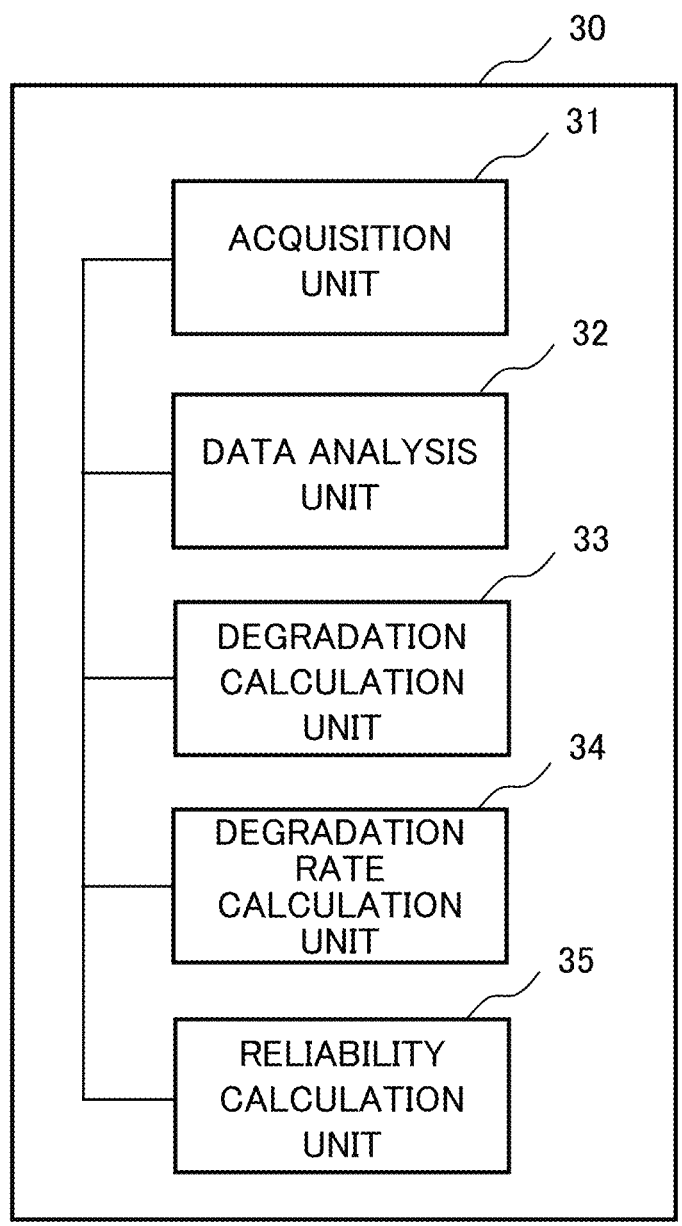
FIG. 2 is a block diagram illustrating an example of a configuration of a degradation diagnosis system.

Next, the degradation diagnosis system 30 will be described with reference to the drawings. FIG. 2 is a block diagram illustrating an example of a configuration of the degradation diagnosis system 30. The degradation diagnosis system 30 illustrated in FIG. 2 includes an acquisition unit 31, a storage unit (not illustrated), a data analysis unit 32, a degradation degree calculation unit 33, a degradation rate calculation unit 34, and a reliability calculation unit 35. The storage unit (not illustrated) is, for example, a storage device such as a hard disk.

The acquisition unit 31 receives, for example, a captured image obtained by capturing a road with a camera, a road section identifier (ID) for identifying the captured road, position information indicating a position of the captured road, and an inspection date on which the road is captured. The acquisition unit 31 stores the captured image, the road section, and the position information in the storage unit in association with each other. The position information is latitude and longitude based on a global positioning system (GPS) mounted together with the camera. The position information may include speed, acceleration, and date and time in addition to latitude and longitude. For example, the camera may be an in-vehicle camera such as a drive recorder. The in-vehicle camera is suitable for capturing the entire road. The camera may be a camera mounted on another moving body such as a bicycle or a drone. Furthermore, the camera may be a camera carried by a person or a fixed camera installed on a road.

The data analysis unit 32 detects a road crack from the captured image of the road section stored in the storage unit. The data analysis unit 32 outputs crack information and the position of the crack to the degradation degree calculation unit 33. The crack information includes a crack shape (line, hexagonal pattern), a length or an area of the crack, and the number of cracks.

The data analysis unit 32 also detects a pot hole in a road from the captured image. The data analysis unit 32 outputs pot hole information and the position of the pot hole to the degradation degree calculation unit 33. The pot hole information includes an area of a pot hole and the number of pot holes.

The degradation degree calculation unit 33 calculates a crack ratio as a degradation degree. The crack ratio is calculated by, for example, 100×(crack area/road section area). In this case, the value of the degradation degree ranges from 0% to 100%. The crack area may be calculated by a predetermined method or the like. As a method of calculating the crack ratio, a known calculation method can be applied in addition to the above.

In the above description, an example in which the crack ratio is used for calculation of the degradation degree has been described, but the present disclosure is not limited to this. For the calculation of the degradation degree, a rutting amount, the international roughness index (IRI), the maintenance control index (MCI), or the like may be used. The rutting amount is a depth of rutting at which a traveling track of a vehicle is lower than other road surfaces due to the load of the vehicle and friction with tires. IRI is an index in which a road surface and the ride comfort of a driver are associated with each other, and represents the degree of unevenness as a numerical value. In a case where a degradation degree is calculated with a rutting amount and IRI, the acquisition unit 31 receives measured data obtained by measuring a road surface by a sensor, a road section ID for identifying the measured road, position information indicating a position of the measured road, and an inspection date on which the road is measured. For example, in a case where a degradation degree is calculated with IRI, the acquisition unit 31 may receive a value from an acceleration sensor during traveling, and the degradation degree calculation unit 33 may calculate IRI. The method of calculating IRI is not limited to the above, and a known calculation method can be adopted. For a rutting amount, the data analysis unit 32 may analyze a captured image of a road, and the degradation degree calculation unit 33 may estimate and calculate the rutting amount on the basis of the analysis result.

The acquisition unit 31 stores measured data, a road section ID, and position information in the storage unit in association with each other. The data analysis unit 32 calculates a rutting amount from a lateral profile on the basis of the measured data on the road, and calculates IRI indicating flatness from a longitudinal profile. In the case of using a rutting amount, the value of the degradation degree is a value of equal to or more than 0 (unit: mm). In the case of using IRI, the value of the degradation degree is a value of equal to or more than 0 (unit: mm/m).

MCI is used to quantitatively evaluates the usability of pavement of a road by a crack ratio, a rutting amount, and a flatness ($\sigma$) value in order to determine maintenance and repair of a road. Flatness ($\sigma$) is calculated from an IRI value by a correlation formula. MCI has four definition equations using a crack ratio, a rutting amount, and flatness ($\sigma$). As a result of calculating the four definition equations, the minimum value is taken as the MCI value of the road. MCI decreases as the pavement degrades.

Which of a crack ratio, a rutting amount, IRI, and MCI is used as the degradation degree indicating the degradation state of a road is selected as appropriate by the road manager.

In the following description, a crack ratio is mainly used as a degradation degree. Therefore, the degradation degree increases when degradation worsens. The value of a degradation degree may decrease when degradation worsens.

The degradation rate calculation unit 34 calculates a degradation rate using a history of a degradation degree of a road section stored in the road inspection data storage unit 22. The degradation rate is a degree of change in degradation degree with respect to time. FIG. 3 is a diagram illustrating an example of a degradation degree history table for road sections. In the degradation degree history table illustrated in FIG. 3, degradation degrees (crack ratio, rutting amount, IRI) for the same road section is recorded for each inspection date and time. MCI may be added to the degradation degrees in FIG. 3.

Figure 4:
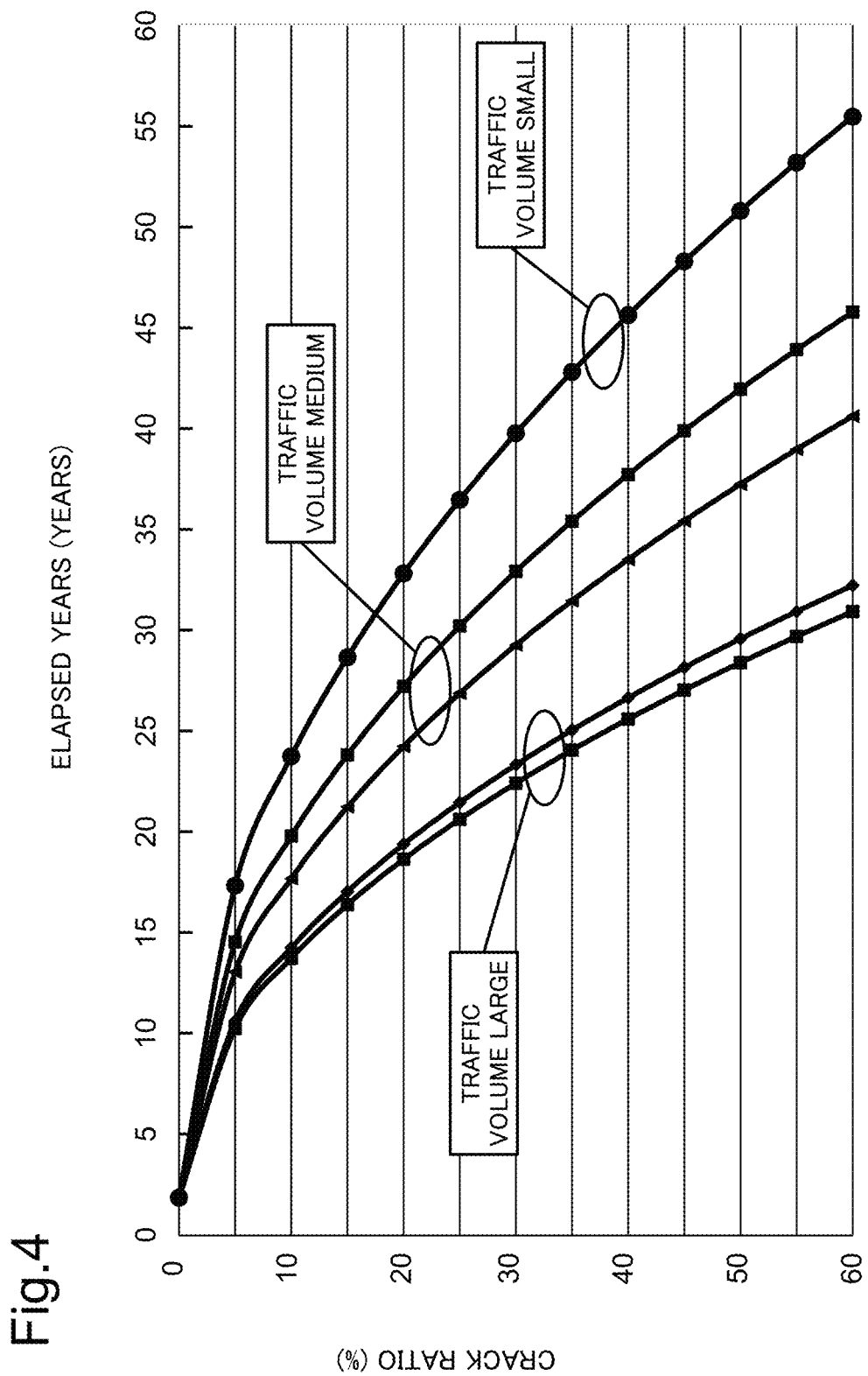
FIG. 4 is a diagram illustrating an example of degradation curves of roads.

The degradation rate calculation unit 34 calculates a degradation rate by applying predetermined regression analysis (for example, linear regression or quadratic curve regression) to the history of a degradation degree. FIG. 4 is a diagram illustrating an example of degradation curves. The degradation curves illustrated in FIG. 4 represent an example in which quadratic curve regression is applied to crack ratios for elapsed years. In FIG. 4, the slope in a degradation curve corresponds to a degradation rate. FIG. 4 illustrates a degradation curve for each traffic volume. A degradation curve of a road with a large traffic volume has a higher rate of change in crack ratio than a degradation curve of a road with a small traffic volume does. That is, the degradation rate is high. The degradation curve of a degradation degree may be of a rutting amount, IRI, or MCI in addition to the crack ratio. In this case, the degradation rate for each of the rutting amount, IRI, and MCI is calculated.

When there are a plurality of road sections, the degradation rate calculation unit 34 calculates a degradation rate for each road section. The degradation rate calculation unit 34 stores the calculated degradation rate in the road inspection data storage unit 22 in association with a road section ID for identifying a road section.

The reliability calculation unit 35 calculates reliability on the basis of the capturing information on a captured image. The reliability represents, for example, the degree of reliability with respect to a degradation degree. Specifically, the reliability represents the degree of whether the captured image is an image suitable for calculating a degradation degree. The capturing information is information on a capturing situation. The capturing information includes, for example, weather (date and time, illuminance, presence or absence of rainfall), a moving speed of a camera, a frame rate of an image, a compression ratio, and the like.

In a case where a cracked portion is estimated by analyzing a captured image, a capturing situation is a factor that affects a result of analyzing the captured image. Specifically, when the weather is fine, it is easy to detect a crack of a road, but a shadow of a structure (sign, street lamp, etc.) beside the road may be erroneously detected. A large shadow such as of a building covering the entire road surface may decrease the illuminance of the entire road surface, and may prevent the visibility or recognition of degradation such as a crack. In the case of rain, the illuminance decreases and a road surface is wet, preventing a crack to be detected. Furthermore, in a case where the moving speed of a camera is high, or in a case where the frame rate or resolution of a captured image is low, the still image becomes unclear, and it is difficult to detect a crack.

For example, in a case where the weather is used as the capturing information, the reliability calculation unit 35 may calculate reliability on the basis of the reliability in a case of fine weather=50%, the reliability in a case of cloudy weather=100%, and the reliability in a case of rainy weather=0%. Alternatively, the reliability calculation unit 35 may calculate the reliability of fine weather and cloudy weather on the basis of the illuminance at the time of capturing. Furthermore, the reliability calculation unit 35 may calculate reliability on the basis of the cloud amount or the precipitation amount at a capturing place at a capturing date and time. The above calculation of reliability is not limiting. Another calculation may be used for derivation as long as it represents the degree of whether the captured image is an image suitable for calculating a degradation degree.

In the following description, reliability values range from 0% to 100%, but this is an example. Example embodiments may use different value ranges of reliability. In the following description, the value of reliability is higher when a degradation degree is more reliable. However, as the value representing reliability, a value that is higher when a degradation degree is less reliable may be used.

As capturing information, at least a part of the capturing information may be acquired from a captured image. Alternatively, capturing information may be received from a predetermined device (not illustrated). For example, capturing information (weather or the like) based on the information on a capturing date and time and a capturing place may be received from an external system.

For the above reliability, at least one of a capturing date and time, the weather at the capturing date and time, and the moving speed of a camera at the time of capturing is used as the capturing information for calculating the reliability.

The reliability calculation unit 35 stores the calculated reliability in the road inspection data storage unit 22 in association with a road section ID.

In the above description, the calculation of a degradation degree, a degradation rate, and reliability in a road section have been described, but a degradation degree, a degradation rate, and reliability at a measurement point can also be calculated in the same manner.

<Degradation Display System>

The degradation display system 10 acquires a degradation index indicating a degradation state of a road section, changes display of a map in accordance with a display range and a scale of the map, and superposes and displays degradation information based on the degradation index of an area on the map to be displayed or a road section in the area. The degradation index includes, for example, a degradation degree, a degradation rate, and reliability. In addition to the degradation information based on the degradation index, the degradation display system 10 may superpose and display information indicating the presence of a pot hole as degradation information with a high degree of urgency. The degradation display system 10 may display a cause, a type, and the like of degradation for each degradation index. For example, when the degradation index is a crack ratio, the degradation display system 10 may detect and classify a type of a crack (longitudinal crack/lateral crack/hexagonal pattern crack, or the like), and superpose and display the information. When the degradation index is IRI, the degradation display system 10 may detect a road structure (crossing, border of bridges, manhole, etc.) that can be a factor of calculating a large IRI value at a place other than a place where a road surface is degraded, and superpose and display the detected factor information.

In the case of mesh display in which the scale of a map to be displayed is small, the degradation display system 10 superposes and displays degradation information based on the degradation index for each predetermined area in a display form corresponding to the degree of the degradation index of the predetermined area in the mesh display. In the case of road map display in which the scale of a map to be displayed is large, the degradation display system 10 superposes and displays degradation information based on the degradation index for each predetermined road section in a display form corresponding to the degree of the degradation index of the predetermined road section. In addition, the degradation display system 10 displays a road image of the road section specified through the road map display, and superposes and displays, on the road image, degradation information based on the degradation index of the road image.

Figures 5, 6:
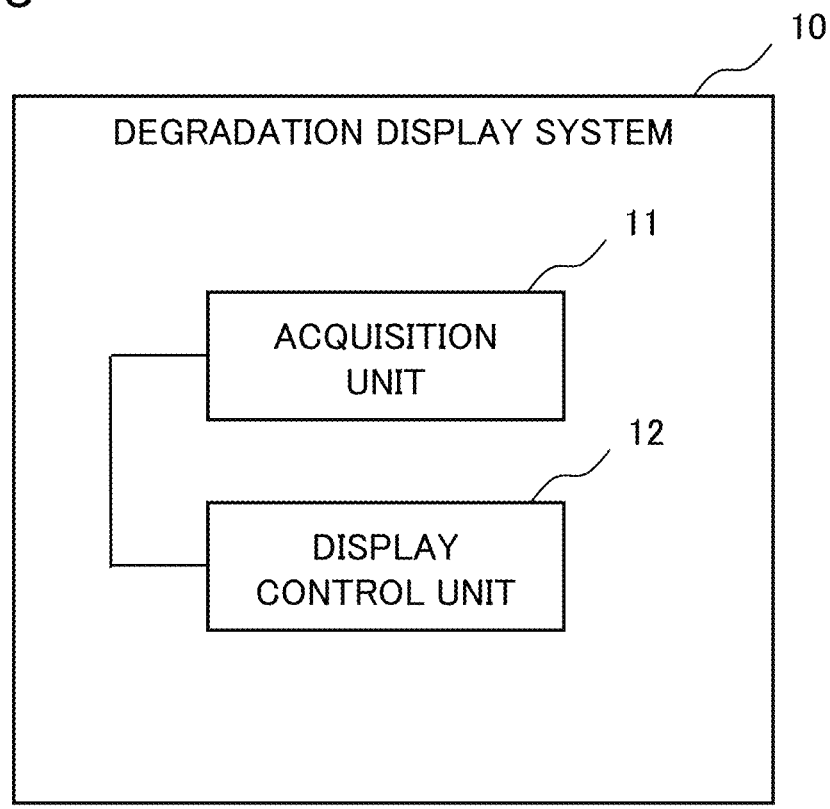
FIG. 5 is a block diagram illustrating a configuration of a degradation display system according to a first example embodiment.
FIG. 6 is a table illustrating an example of degradation degree levels of degradation degrees.

A configuration of the degradation display system 10 according to the first example embodiment will be described with reference to the drawings. FIG. 5 is a block diagram illustrating a configuration of the degradation display system 10 according to the first example embodiment. The degradation display system 10 includes an acquisition unit 11 and a display control unit 12. The degradation display system 10 is communicably connected to the map information storage unit 21 and the road inspection data storage unit 22.

(Acquisition Unit)

The acquisition unit 11 acquires map information from the map information storage unit 21, and outputs the acquired map information to the display control unit 12. The acquisition unit 11 acquires predetermined road inspection data from the road inspection data storage unit 22, and outputs the acquired road inspection data to the display control unit 12. For example, the acquisition unit 11 acquires a degradation index of each road section in an area for each area from the road inspection data storage unit 22. The acquisition unit 11 acquires a degradation index level for each degradation index from the road inspection data storage unit 22. The degradation index level is, for example, a degradation degree level, a degradation rate level, and a reliability level. FIGS. 6, 7, and 8 illustrate tables indicating levels for each degradation index (degradation degree, degradation rate, reliability). The degradation degree level, the degradation rate level, and the reliability level illustrated in FIGS. 6, 7, and 8 each include three levels, but are not limited to three levels.

FIG. 6 is a table illustrating an example of degradation degree levels of degradation degrees. The degradation degree level illustrated in FIG. 6 is divided into three levels in accordance with the value ranges of the degradation degrees. The value ranges of the degradation degrees in association with the degradation degree levels are not limited to the example illustrated in FIG. 6. In the drawing, the value of a degradation degree level is defined to increase when the degradation degree worsens, but may be defined to decrease when the degradation degree worsens.

FIG. 7 is a table illustrating an example of degradation rate levels of degradation rates. The degradation rate level illustrated in FIG. 7 is divided into three levels in accordance with the ranges of the degradation rates. The value ranges of the degradation rates in association with the degradation rate levels are not limited to the example illustrated in FIG. 7. In the drawing, the value of a degradation rate level is defined to increase when the degradation rate is high, but may be defined to decrease when the degradation rate is high.

FIG. 8 is a table illustrating an example of reliability levels of reliability. The reliability level illustrated in FIG. 8 is divided into three levels in accordance with the ranges of the reliability. The value ranges of the reliability in association with the reliability levels are not limited to the example illustrated in FIG. 8. In the drawing, the value of a reliability level is defined to increase when the reliability is high, but may be defined to decrease when the reliability is high.

FIG. 9 is a table illustrating a part of road inspection data on road sections included in an area. The road inspection data illustrated in FIG. 9 includes the position information, degradation indexes (degradation degree, degradation rate, reliability), inspection date and time, and urgency for each road section in the area. The road inspection data acquired by the acquisition unit 11 is not limited to the data in the example of FIG. 9.

(Display Control Unit)

Figure 10:
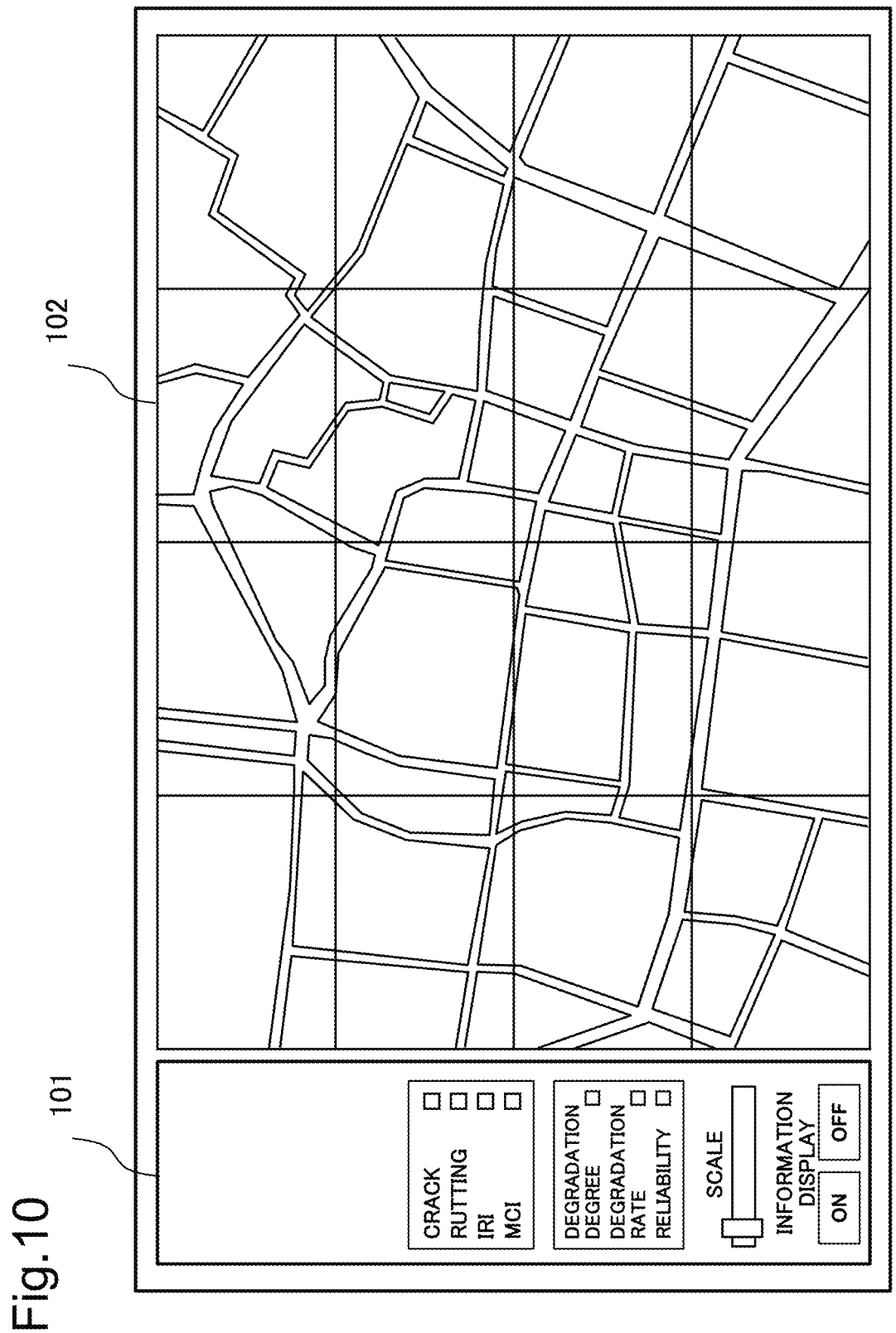
FIG. 10 is a diagram illustrating an example of mesh display of a map.

The display control unit 12 displays degradation information indicating a degradation state of a road in three modes of mesh display, road map display, and road image display. In the mesh display, a map is divided into areas of a predetermined range. FIG. 10 is a diagram illustrating an example of mesh display of a map. The display screen illustrated in FIG. 10 includes an operation display 101 and a degradation information display 102. The operation display 101 includes a selection button for selecting display of a degradation degree (crack, rutting, IRI, MCI) and a selection button for selecting display of a degradation index (degradation degree, degradation rate, reliability). Crack is related to a crack ratio and rutting is related to a rutting amount. The types displayed by the selection buttons for the degradation degree and the degradation index are not limited to the types in the example of FIG. 10. Furthermore, the operation display 101 includes a scale bar for changing the scale of the map, and display switching buttons for switching ON/OFF of superposed display of the degradation information. The display control unit 12 changes the information to be displayed on the screen in response to input to the selection buttons, the scale bar, and the display switching buttons. The selection buttons, the scale bar, and the display switching buttons are similarly illustrated in the display examples illustrated in FIGS. 11 to 14.

The display range of the map in one area can be set as desired. In order to simplify the description, it is assumed that the divided areas have the same size. The display range of an area may be determined in advance, and the number of areas (the number of divisions) displayed on the screen may be changed in accordance with the scale of the map. In this case, in the mesh display, reducing the scale of the map increases the number of areas to be displayed. Alternatively, the scale of the map may be fixed, and the display range of one area may be changed in accordance with the number of divisions. In the road map display, roads included in an area are displayed.

In the mesh display and the road map display, the display control unit 12 displays a map based on map information, and superposes and displays degradation information on an area or a road section. In the road image display, the display control unit 12 displays a road image related to a road section, and superposes and displays degradation information on the road section or the road image.

The display control unit 12 will be described separately for the mesh display, the road map display, and the road image display.

[Mesh Display]

Figure 11:
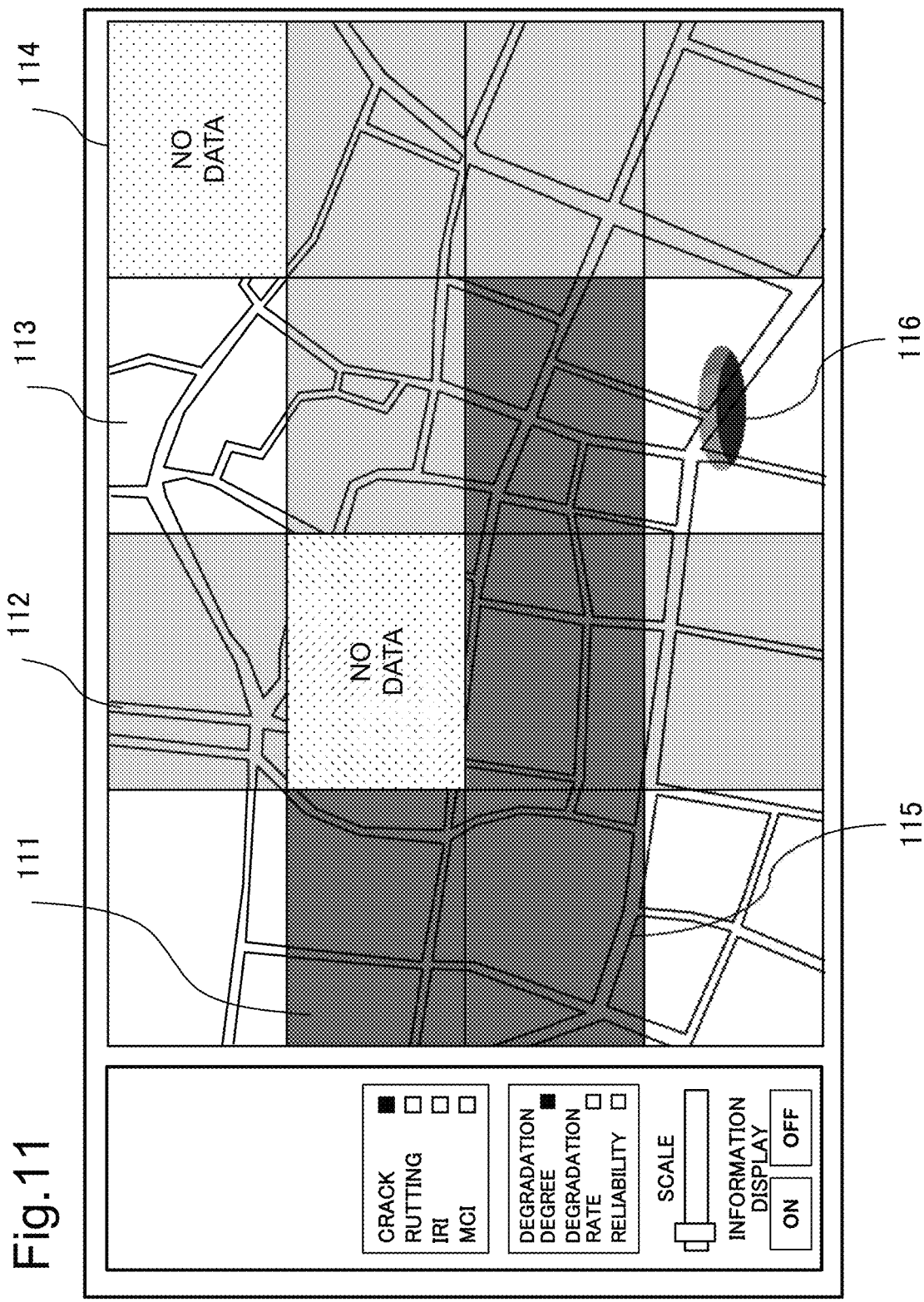
FIG. 11 is a diagram illustrating an example of a display form corresponding to a representative level of a degradation index for each area.

FIG. 11 is a diagram illustrating an example of a display form corresponding to a representative level of a degradation index for each area.

The display control unit 12 determines a representative level representing a degradation index of an area on the basis of the degradation index level of each road section in the area. The representative level representing the degradation index of the area (hereinafter, it may be simply referred to as a representative level of an area) is determined, for example, as follows.

(A) The display control unit 12 determines the representative level of an area on the basis of the degradation index level of each road section in the area. For example, the highest degradation index level (degradation index level indicating the worst degradation) among those of the road sections is set as the representative level of the area. In this case, if there is at least one road section having the degradation index level "3" among a plurality of road sections, the representative level of the area is "3".

(B) The display control unit 12 determines the representative level on the basis of the ratio of the highest degradation index level (degradation index level indicating the worst degradation) for a degradation index of each road section in the area. For example, when the ratio of the degradation index level "3" is equal to or more than 50%, the representative level of the area is set to "3", and when the ratio of the degradation index level "3" is equal to or more than 20% and less than 50%, the representative level of the area is set to "2". When the ratio of the degradation index level "3" is less than 20%, the representative level of the area is set to "1".

(C) The display control unit 12 determines the representative level of a degradation index of an area on the basis of the ratio of the representative level of each road section in the area. For example, the representative level of road sections having the highest ratio of the number of representative levels of road sections to the total number of road sections in an area is set as the representative level of the area.

[Number of representative levels "3" of road sections]/[Total number of road sections]×100

[Number of representative levels "2" of road sections]/[Total number of road sections]×100

[Number of representative levels "1" of road sections]/[Total number of road sections]×100

In this example, the representative level of the degradation index of the area is "2". How to obtain the representative level of a road section will be described in the following road map display.

(D) The display control unit 12 determines the representative level representing a degradation index of an area on the basis of an average value of the degradation index levels of road sections in the area. For example, the representative level is determined by comparing the calculated average value with a range set for determining the representative level.

The display control unit 12 superposes and displays information in a display form corresponding to the determined representative level for each area. The display form corresponding to the representative level includes, for example, the gradation (transmittance) and color of a superposed image superposed on an area, the thickness of an area frame, and an icon. The display form may include a change in gradation or color of the superposed image or blinking of the superposed image.

The example of the mesh display by the display control unit 12 is not limited to the above. For example, when "crack" is selected as a degradation degree, the display control unit 12 may display each piece of information by setting the difference in degradation degree for each area as the difference in color of the area (for example, cyan, magenta, yellow, or the like), setting the difference in degradation rate for each area as the difference in blinking cycle of the area, and setting the difference in reliability for each area as the difference in gradation of the area. As a result, display is possible that allows checking of the degradation degree, the degradation rate, and the reliability with respect to the crack ratio by taking a look at the single area. It is not necessary to simultaneously display the three of the degradation degree, the degradation rate, and the reliability; the degradation degree, the degradation rate, and the reliability may be selectively displayed.

Areas 111, 112, and 113 in FIG. 11 are display examples in which representative levels of a degradation index are "3", "2", and "1", respectively. In the example of FIG. 11, the gradation (transmittance) of each area is determined in accordance with the corresponding representative level of the degradation index. In FIG. 11, in order to simplify the display, the display of the representative level "1" of the area 113 is presented by a transmittance of 0% in the gradation of the area. A sign "NO DATA" in an area 114 indicates that there is no road inspection data in the area 114, or that there is a road that has not been inspected for more than a predetermined number of years.

An area 115 represents an example in which the color of the frame of the area 115 is changed or the area is changed by blinking in order to further attract attention to the area having the representative level "3" of the degradation index. An icon 116 indicates that there is a pot hole in a road in the area.

In FIG. 11, the icon 116 indicates that there is a pot hole in a road section in the area. When data indicating the presence of a pot hole is detected in acquired road inspection data on a road section, the display control unit 12 superposes and displays the icon 116 of the pot hole, as information with a high degree of urgency, on the area in the mesh display. The icon of a pot hole is superposed and displayed on an area regardless of the representative level of the area. For example, if the representative level of an area is "1" and there is a pot hole in a road section in the area, the icon of the pot hole is superposed and displayed on the area.

[Road Map Display]

Figure 12:
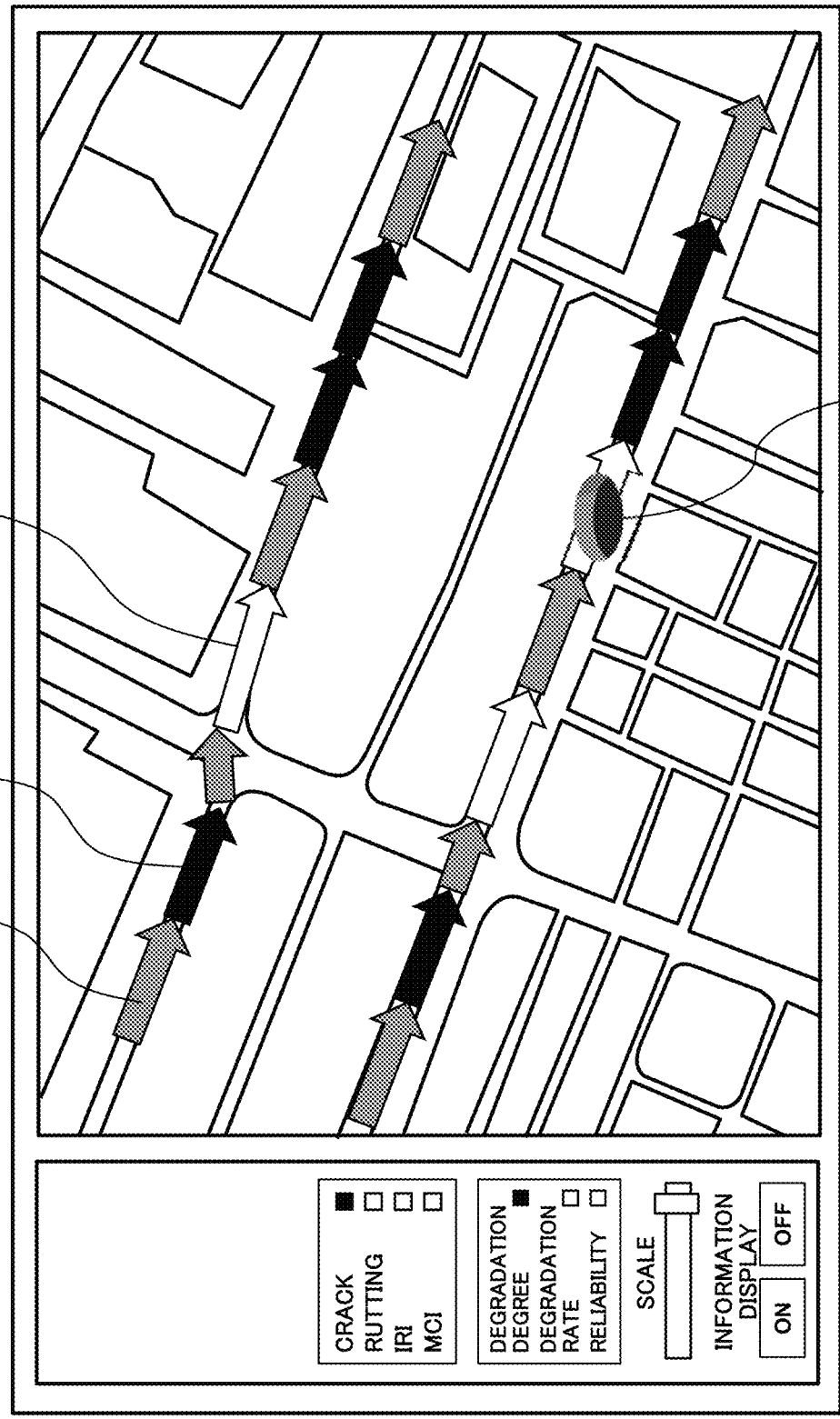
FIG. 12 is a diagram illustrating an example of a display form corresponding to a representative level of a degradation index for each road section.

FIG. 12 is a diagram illustrating an example of a display form corresponding to a representative level of a degradation index for each road section. The display control unit 12 superposes and displays, for each road section, information in a display form corresponding to the representative level of the degradation index of the road section.

The representative level of a degradation index of a road section is, for example, the highest degradation index level among degradation index levels (degradation degree level, degradation rate level, reliability level) of the road section. For example, in a certain road section, when the degradation degree level is "3", the degradation rate level is "2", and the reliability level is "1", the representative level of the degradation indexes of the road section is "3". The representative level of a degradation index of a road section is not limited to the above example. For example, the representative level of a degradation index of a road section may be determined on the basis of the degradation index obtained by a plurality of times of traveling on the same road section.

For example, the display control unit 12 may determine the representative level on the basis of the ratio of the highest degradation index level (degradation index level indicating the worst degradation) for a plurality of degradation indexes obtained in the same road section. Alternatively, the display control unit 12 may set, as the representative level of the degradation index of the road section, the representative level of the degradation index having the highest ratio of the number of representative levels of the road section to the number of times of traveling on the same road section. The representative level representing the degradation indexes of an area may be determined on the basis of the average value of the degradation index levels of a road section obtained by travelling the same road section a plurality of times.

The display control unit 12 determines the highest degradation index level among the degradation index levels for each degradation index of the road section as a representative level.

The display control unit 12 superposes and displays, for each road section, information in a display form corresponding to the representative level. The display form corresponding to the representative level is, for example, the gradation (transmittance), color, shape, or the like of an arrow indicating a road section. The display form may be a change in the gradation or color of an arrow or blinking. In FIG. 12, there are three types of gradations associated with the respective degradation index levels for the arrows of road sections. The gradations of the arrows of a road section 121, a road section 122, and a road section 123 in FIG. 12 are associated with the representative levels "3", "2", and "1", respectively, of a degradation index of the road sections. The direction of the arrows of the road sections represents the traveling direction of an inspection vehicle at the time of road inspection.

In FIG. 12, an icon 124 indicates that there is a pot hole in a road section. When data indicating the presence of a pot hole is detected in acquired road inspection data on a road section, the display control unit 12 superposes and displays the icon 124 of the pot hole, as information with a high degree of urgency, on the road section in the road map display. The icon of a pot hole is superposed and displayed on a road section regardless of the representative level of the road section. For example, if the representative level of a road section is "1" and there is a pot hole in the road section, the icon of the pot hole is superposed and displayed on the road section.

In the above description, in the road map display, the highest degradation index level among the degradation index levels (degradation degree level, degradation rate level, reliability level) of a road section is set as the representative level of the degradation index of the road section, but the present disclosure is not limited to this. For example, the degradation index level of the road section may be superposed and displayed as the representative level for each degradation index. Specifically, in the road map display, the display control unit 12 may superpose and display a degradation index level for each degradation index (degradation degree, degradation rate, reliability) on a road section as a representative level. In this case, the display form (for example, gradation) corresponding to the representative level changes depending on the degradation index level for each degradation index.

The example of road map display by the display control unit 12 is not limited to the above. For example, when "crack" is selected as a degradation degree, the display control unit 12 may display each piece of information by setting the difference in degradation degree as the difference in color of the arrow (for example, cyan, magenta, yellow, or the like), setting the difference in degradation rate as the difference in blinking cycle of the arrow, and setting the difference in reliability as the difference in gradation of the arrow. As a result, display is possible that allows checking of the degradation degree, the degradation rate, and the reliability with respect to the crack ratio by taking a look at the single arrow. It is not necessary to simultaneously display the three of the degradation degree, the degradation rate, and the reliability; the degradation degree, the degradation rate, and the reliability may be selectively displayed.

[Road Image Display]

Figure 13:
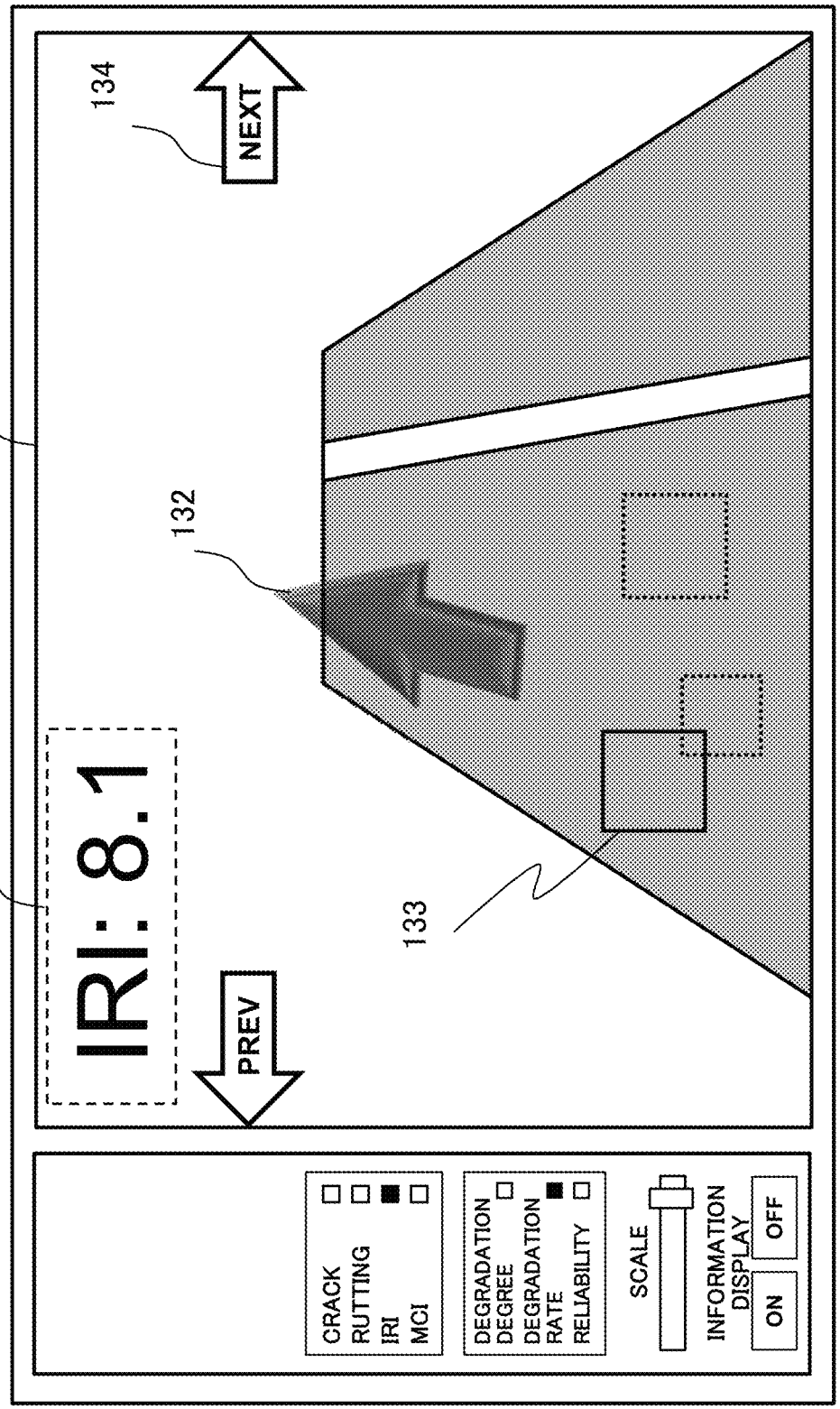
FIG. 13 is a diagram illustrating an example of superposing and displaying a degradation index on a road image.

In the road image display, a road image corresponding to each road section is displayed. FIG. 13 is a diagram illustrating an example of superposing and displaying a degradation index on a road image. The display control unit 12 acquires a captured image related to a predetermined road section from the road inspection data storage unit 22, and displays a road image 130.

Furthermore, the display control unit 12 superposes and displays, on the road image 130, a degradation index of the road section in the road image. In FIG. 13, an IRI value among the degradation degrees of the road section is displayed in a display area 131. In the display area, a value of the degradation index having the highest degradation index level among the degradation indexes may be displayed. Although the degradation index for one lane is displayed in FIG. 13, when there are a plurality of lanes, the degradation index may be displayed in units of lanes in the road image. The display control unit 12 may display not only a degradation index of the road section in the road image but also a degradation index of the road image (for example, a degradation index calculated from the road image) for the road image display.

A solid arrow 132 illustrated in FIG. 13 is one of display forms of the degradation rate of a road section related to the road image 130. The display control unit 12 may express the degree of degradation rate by changing the solid arrow 132, that is, the size and shape of the arrow, the angle of the arrow with respect to the road, the gradation, color, and blinking speed of the arrow. The solid arrow 132 may express a plurality of degradation indexes by display forms. For example, degradation indexes may be expressed in combination by presenting a degradation degree by the size of the solid arrow 132, and a degradation rate by the speed at which the solid arrow 132 blinks.

A frame 133 in FIG. 13 represents a portion where a hexagonal pattern crack is present in the road image. The display control unit 12 superposes and displays the frame 133 at a position where the hexagonal pattern crack is present in the road image on the basis of road inspection data related to the road image. The display control unit 12 may change the thickness, color, or line type of the solid line of the frame in relation to the degree of the hexagonal pattern crack. When the frame 133 is clicked with a mouse, the display control unit 12 displays a detailed image related to the frame 133.

A button display 134 in FIG. 13 is a button for displaying the next road image. When the button display 134 on the road image is clicked with the mouse, the display control unit 12 displays the next road image of the road section.

Figure 14:
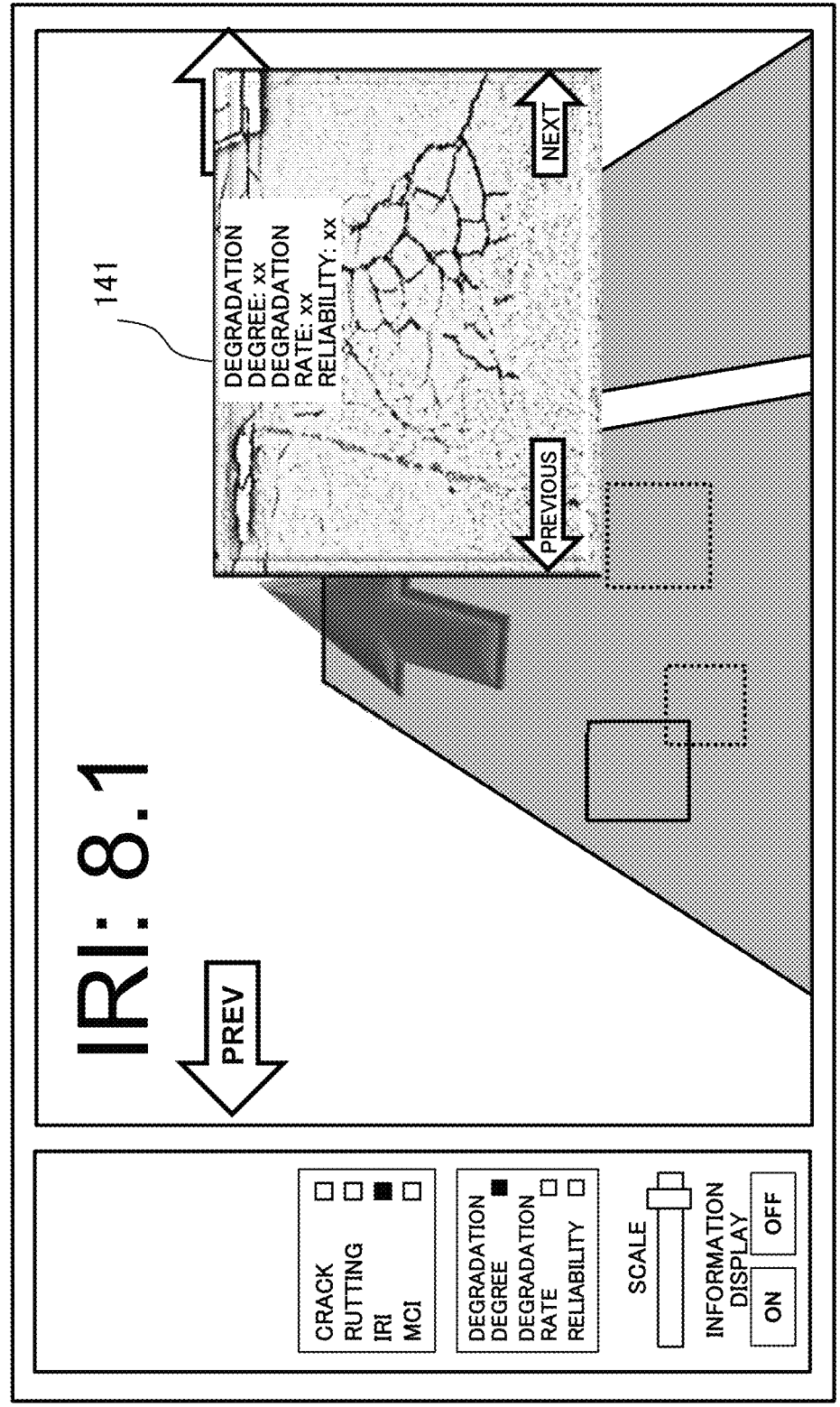
FIG. 14 is a diagram illustrating an example of superposing and displaying a captured image on a road image.

FIG. 14 is a diagram illustrating an example of a display screen on which a detailed image is superposed and displayed on a road image. A detailed image 141 of FIG. 14 is an image of a hexagonal pattern crack related to the frame 133. The display control unit 12 may display a degradation index related to the hexagonal pattern crack in the detailed image 141. In the detailed image 141 of FIG. 14, the three degradation indexes of the degradation degree, the degradation rate, and the reliability are superposed and displayed, but the present disclosure is not limited to these. For example, the degradation index having the highest degradation index level among the three degradation indexes may be superposed and displayed.

The display control unit 12 may display, in the detailed image 141, an arrow button for sequentially displaying a plurality of detailed images included in the road image 130. The display control unit 12 may display road images or detailed images side by side in time series together with a main road image.

Figure 15:
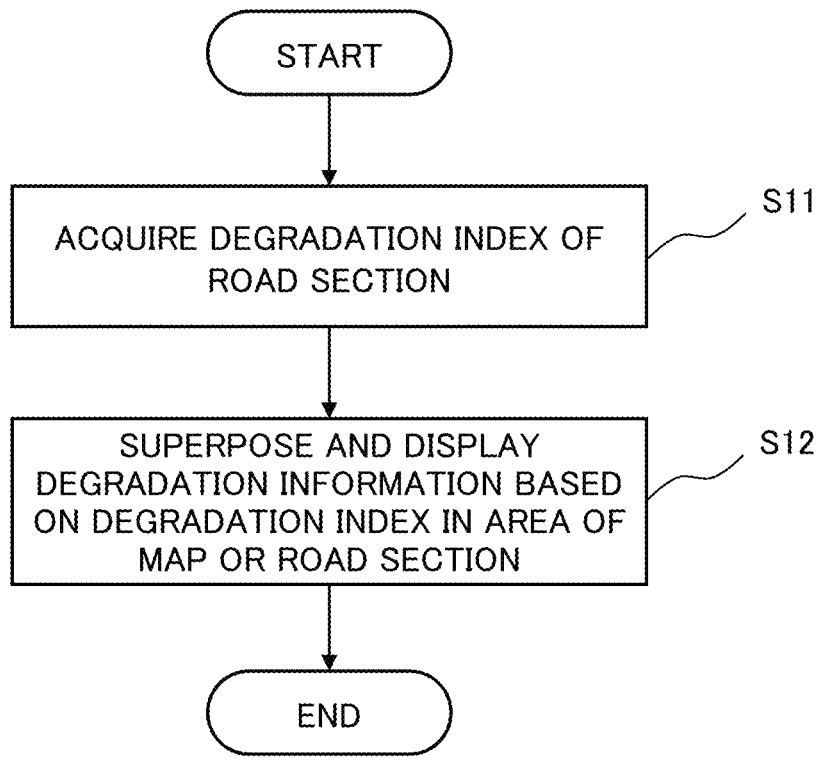
FIG. 15 is a flowchart illustrating an operation of the degradation display system of the first example embodiment.

Next, an operation of the degradation display system according to the first example embodiment will be described with reference to the drawings. FIG. 15 is a flowchart illustrating an operation of the degradation display system 10. The degradation display system 10 acquires road inspection data including a degradation index of a road section from the road inspection data storage unit 22 that stores road inspection data obtained by the degradation diagnosis system 30, and displays degradation information based on the degradation index in accordance with the mesh display, the road map display, or the road image display.

Specifically, the acquisition unit 11 acquires a degradation index indicating a degradation state of a road section (step S11). The acquisition unit 11 outputs the acquired degradation index of the road section to the display control unit 12. The display control unit 12 changes display of a map in accordance with a display range and a scale of the map, and superposes and displays degradation information based on the degradation index of an area on the map to be displayed or a road section in the area (step S12).

In a case in which the scale of a map to be displayed is small (mesh display), the display control unit 12 superposes and displays degradation information based on the degradation index for each predetermined area in a display form corresponding to the degree of the degradation index of the area. In a case in which the scale of a map to be displayed is large (road map display), the display control unit 12 superposes and displays degradation information based on the degradation index for each predetermined road section in a display form corresponding to the degree of the degradation index of the predetermined road section.

Hereinafter, mesh display processing, road map display processing, and road image display processing by the degradation display system 10 will be described.

[Mesh Display]

Figure 16:
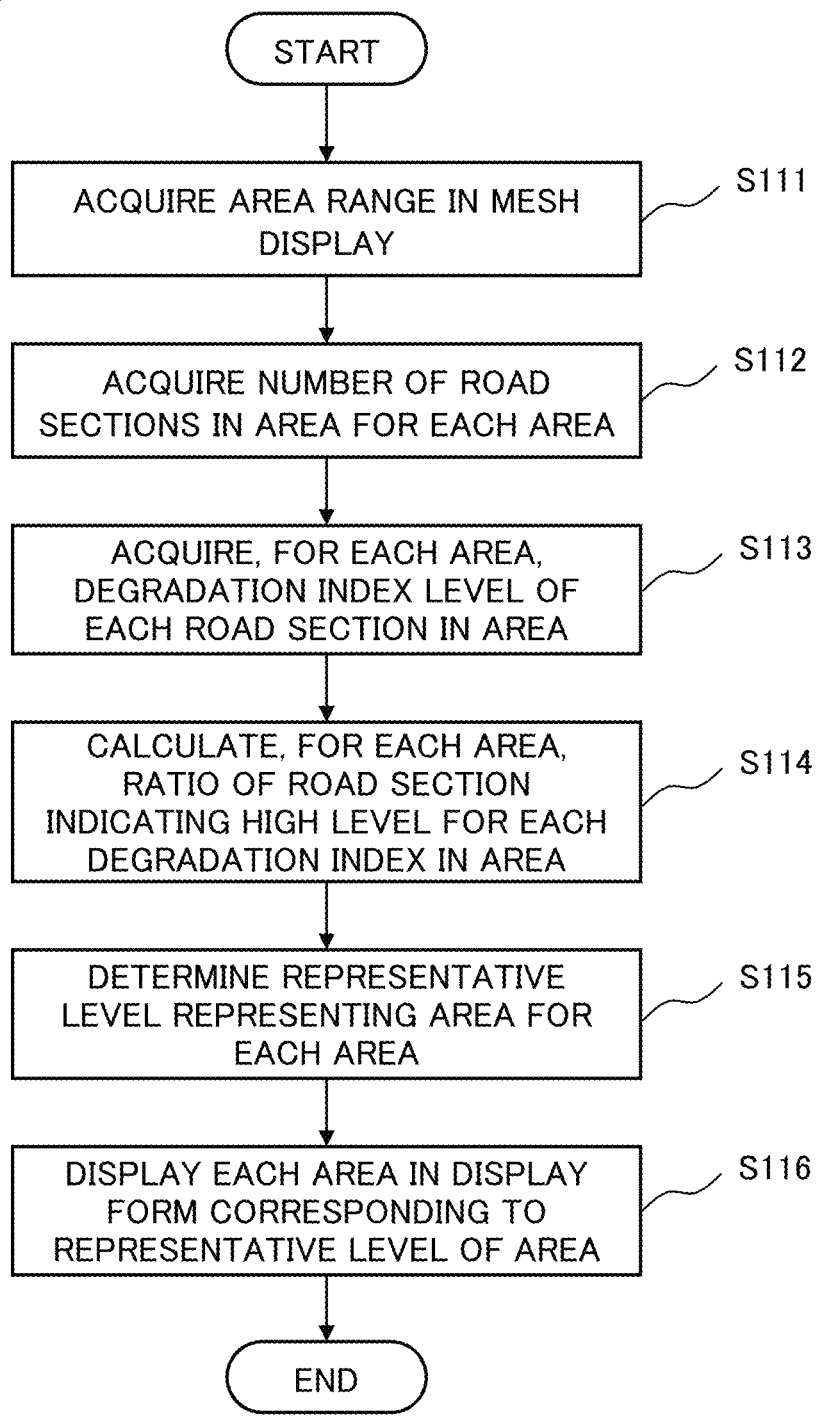
FIG. 16 is a flowchart illustrating an operation of mesh display processing.

FIG. 16 is a flowchart illustrating an operation of mesh display processing. The acquisition unit 11 acquires an area range of mesh display (step S111). The area range is determined by a mesh size. For example, road sections in an area are identified on the basis of position information indicating an area range in a map and position information on the road sections in road inspection data. The acquisition unit 11 acquires the number of road sections in an area for each area in the mesh display (step S112). The acquisition unit 11 acquires, for each area, a representative level of each degradation index of each road section in the area (step S113).

The display control unit 12 calculates, for each mesh area, the ratio of road sections having the highest degradation index for each degradation index of the area or the basis of the representative levels of the degradation indexes (degradation degree, degradation rate, reliability) of each road section (Step S114). The display control unit 12 determines, for each area, the representative level representing the area on the basis of the calculated ratio (step S115). The display control unit 12 superposes and displays, for each area, information in an display form corresponding to the representative level of the area (step S116).

[Road Map Display]

Figure 17:
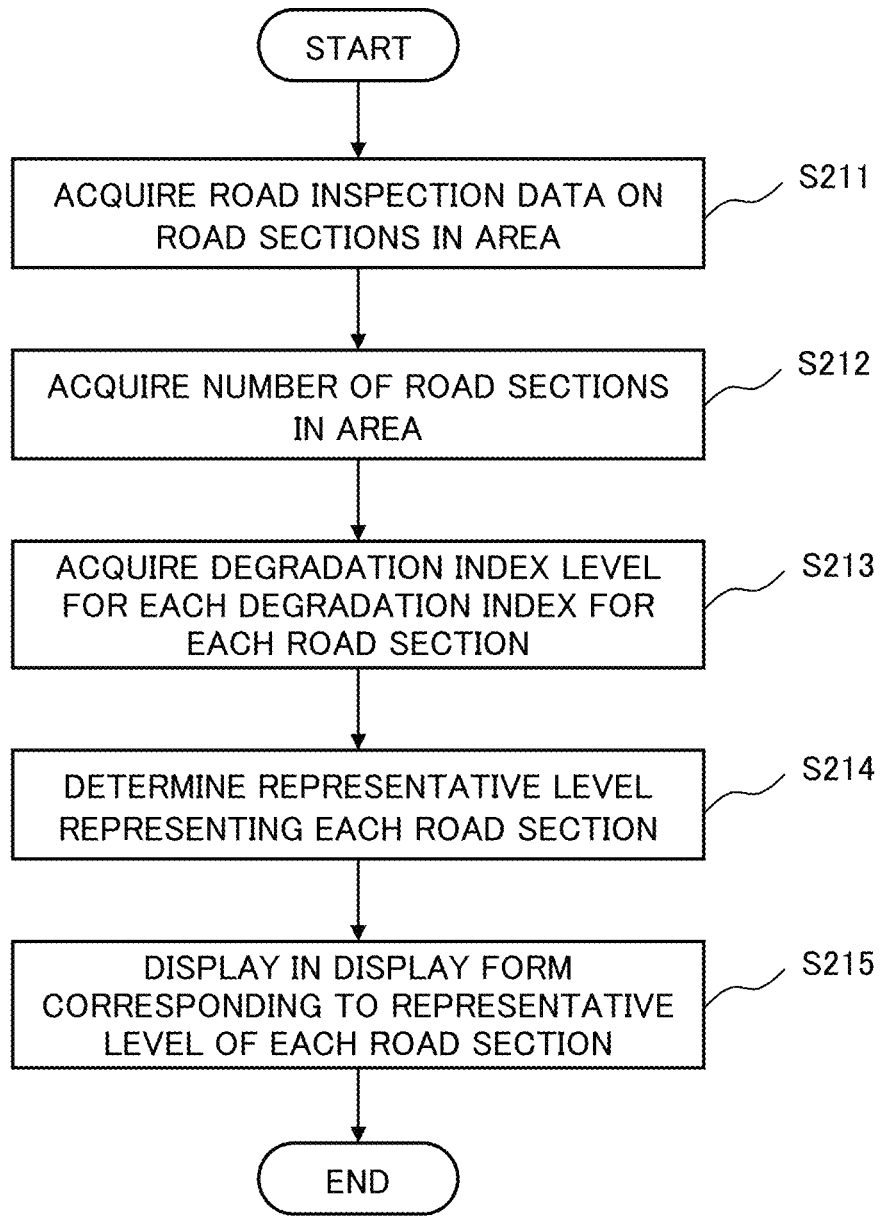
FIG. 17 is a flowchart illustrating an operation of road map display processing.

Road map display processing by the degradation display system 10 will be described. FIG. 17 is a flowchart illustrating an operation of road map display processing. In the road map display, the degradation display system 10 superposes and displays degradation information based on a degradation index of a road section in an area.

The acquisition unit 11 acquires road inspection data on each road section (including a measurement point) in the area from the road inspection data storage unit 22 (step S211). The acquisition unit 11 acquires the number of road sections in the area on the basis of the acquired road inspection data (step S212).

The acquisition unit 11 refers to the level table of each degradation index illustrated in FIGS. 6 to 8, and acquires a degradation index level for each degradation index (degradation degree, degradation rate, reliability) of each road section (step S213). The acquisition unit 11 outputs, for each road section, the acquired degradation index level for each degradation index of the road section to the display control unit 12.

The display control unit 12 determines the highest degradation index level among the degradation index levels for each degradation index of the road section as the representative level of the road section for each road section (step S214). The display control unit 12 superposes and displays the representative level of each road section in an display form corresponding to the degradation index (step S215).

[Road Image Display]

Figure 18:
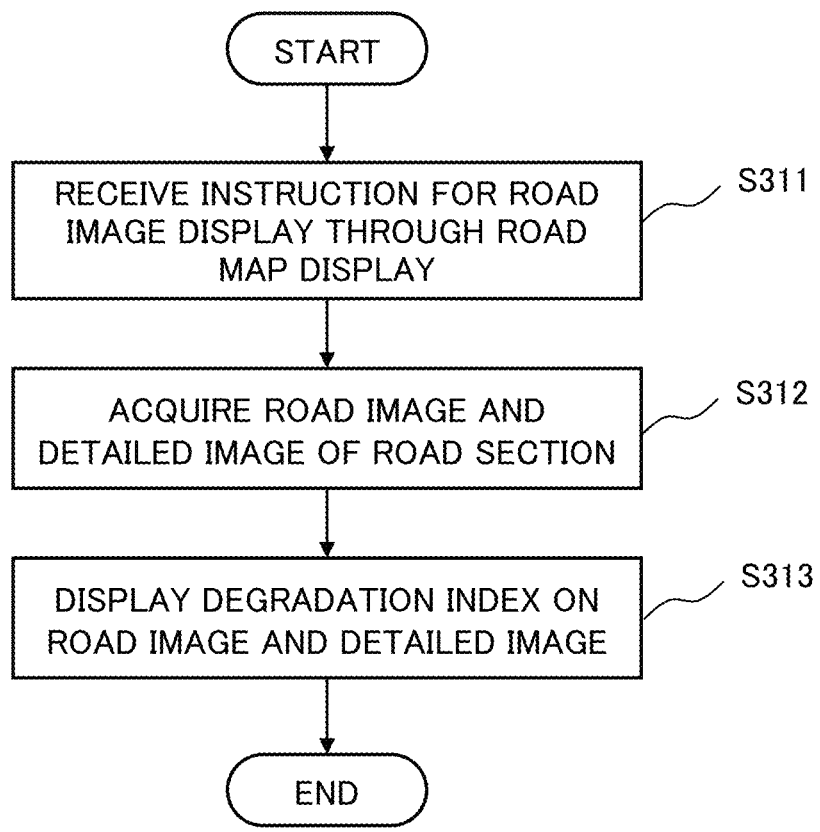
FIG. 18 is a flowchart illustrating an operation of road image display processing.

FIG. 18 is a flowchart illustrating an operation of road image display processing. The display control unit 12 receives an instruction for displaying a road image in the road map display (step S311). For example, the display control unit 12 detects that the road section 121 is clicked with the mouse in the road image display illustrated in FIG. 12, and acquires a road image of the road section 121 and a detailed image of the road image from the road inspection data storage unit 22 (step S312). The road image and the detailed image are captured images of a road. The display control unit 12 superposes and displays a degradation index associated with the road image and the detailed image (step S313).

With the degradation display system according to the first example embodiment, degradation information indicating a degradation state of a road can be displayed in accordance with a display range of a map. This is because the acquisition unit 11 acquires the road inspection data inspected by the degradation diagnosis system, and the display control unit 12 displays the degradation information on the road in accordance with the scale of the map, such as in the mesh display, the road map display, and the road image display. Specifically, this is because the display control unit 12 determines, for each area, a representative level representing a degradation index of a road section in the area in the mesh display, and superposes and displays information in a display form corresponding to the representative level. In the mesh display, the degradation states of roads in each area can be grasped in a bird's-eye view. Furthermore, degradation information on the degree of urgency such as a pot hole can be displayed in a display form that can attract attention in the mesh display or the road map display.

The display control unit 12 displays degradation information on a road in accordance with the scale of a map, such as in the mesh display, the road map display, and the road image display, so that display can be performed in a manner that allows deep digging from a map that allows overlooking of areas where road degradation information is displayed to a road image related to a road section. As a result, the road manager can more efficiently set an inspection plan or a repair plan of a road.

(Hardware Configuration)

Figure 19:
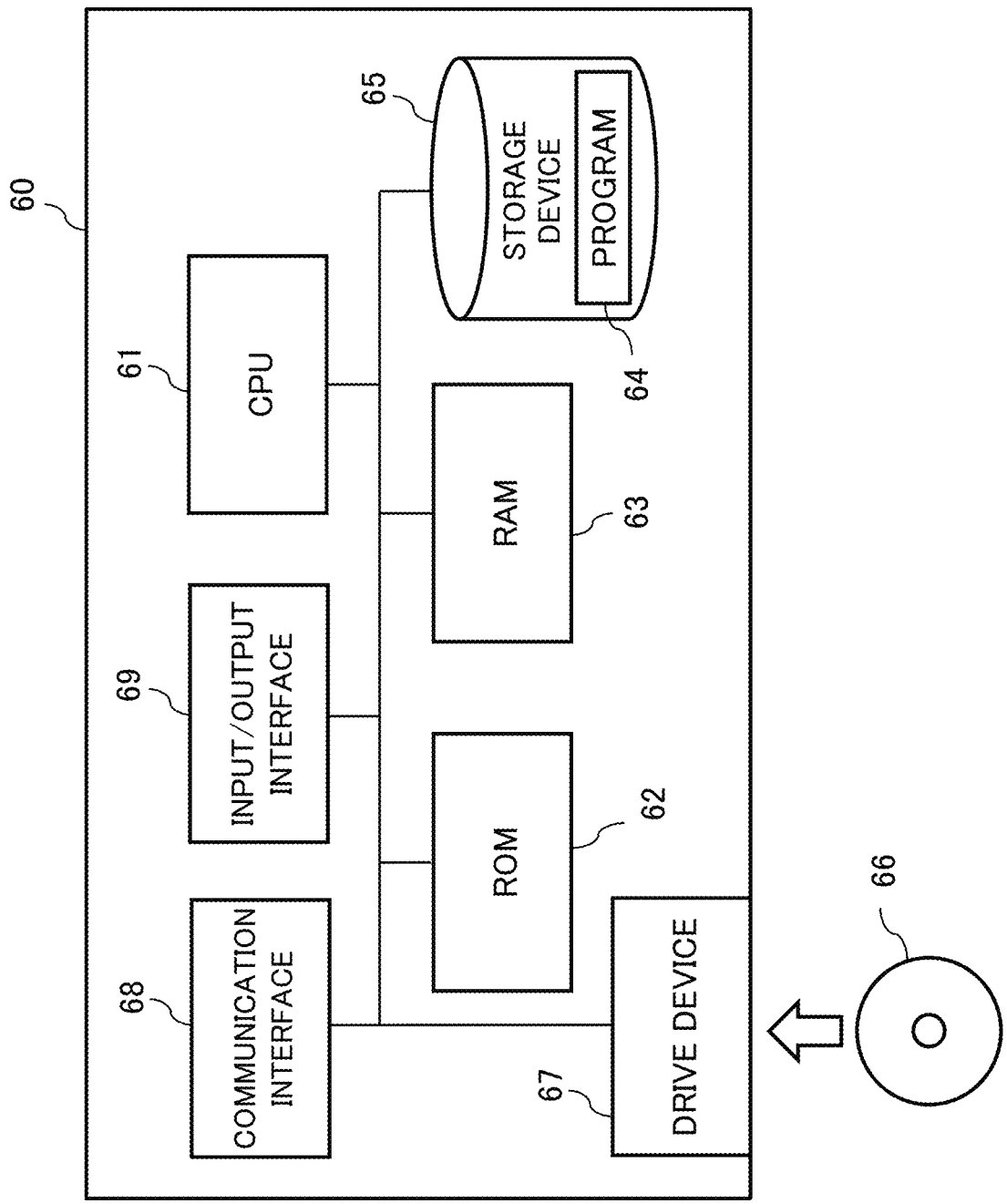
FIG. 19 is a diagram illustrating a hardware configuration of a computer.

The degradation display system 10 includes a computer 60 illustrated in FIG. 19. The degradation display system 10 is implemented by causing a central processing unit (CPU) 61 to execute a function of each component of the degradation display system 10 by a program 64. The function of each component may be implemented by the CPU 61 reading the program 64 from a read only memory (ROM) 62 or a storage device 65 and executing the read program 64 using the CPU 61 and a random access memory (RAM) 63. The components are the acquisition unit 11 and the display control unit 12 of the degradation display system 10.

It can also be understood that the degradation display system 10 above is configured by a computer-readable storage medium 66 that stores a program executed by the CPU 61. The degradation diagnosis system 30 can also be configured by the computer 60. The storage medium 66 is, for example, a hard disk drive, a disk medium or a memory card detachable from a drive device 67, or the like. For example, the components of the acquisition unit 11 and the display control unit 12 of the degradation display system 10 may be dedicated hardware with integrated circuits. The computer 60 may include a communication interface 68 connectable to a network, and an input/output interface 70. The components of the degradation display system 10 and the degradation diagnosis system 30 may be distributed and arranged in a plurality of devices, and in that case, by communicably connecting the plurality of devices, the components can function similarly to a single device.

The present disclosure is not limited to the above-described example embodiments, and various modifications can be made. Example embodiments obtained by appropriately combining configurations, operations, and processes disclosed in different example embodiments are also included in the technical scope of the present disclosure.

While the present disclosure has been particularly shown and described with reference to example embodiments, the present disclosure is not limited to these example embodiments. It will be understood by those of ordinary skill in the art that various aspects may be applied therein without departing from the spirit and scope of the present disclosure as defined by the claims.

This application is based upon and claims the benefit of priority from Japanese patent application No. 2020-06291620, filed on Mar. 31, 2020, the disclosure of which is incorporated herein in its entirety by reference.

Some or all of the above example embodiments can be described as the following supplementary notes, but are not limited to the following.

[Supplementary Note 1]

A degradation display system including:

an acquisition means configured to acquire a degradation index indicating a degradation state of a road section; and a display control means configured to change display of a map in accordance with a display range and a scale of the map, and superpose and display degradation information based on the degradation index of an area on the map or the road section in the area, in which the display control means superposes and displays, for each area, the degradation information based on the degradation index in a display form corresponding to a degree of the degradation index of the area when the scale of the map is small, and the display control means superposes and displays, for each road section, the degradation information based on the degradation index in a display form corresponding to a degree of the degradation index of the road section when the scale of the map is large.

[Supplementary Note 2]

The degradation display system according to Supplementary Note 1, in which the degree of the degradation index of the area is determined based on a degradation index of the road section in the area.

[Supplementary Note 3]

The degradation display system according to Supplementary Note 1 or 2, in which the display control means is capable of displaying a road image of the road section, and superposes and displays, on the road image, the degradation information based on the degradation index of the road image in a display form corresponding to the degradation index of the road image.

[Supplementary Note 4]

The degradation display system according to any one of Supplementary Notes 1 to 3, in which the degree of the degradation index is determined based on at least one degradation index level of each degradation index.

[Supplementary Note 5]

The degradation display system according to Supplementary Note 4, in which the degree of the degradation index of the area is a representative level representing the degradation index of the area determined based on the degradation index level for each road section in the area.

[Supplementary Note 6]

The degradation display system according to Supplementary Note 4, in which the degree of the degradation index of the area is a representative level representing the degradation index of the area determined based on a ratio of the degradation index level that is highest for the degradation index of each road section.

[Supplementary Note 7]

The degradation display system according to Supplementary Note 4, in which the degree of the degradation index of the area is a representative level of the degradation index of the area determined based on a ratio of the representative level for each road section in the area.

[Supplementary Note 8]

The degradation display system according to Supplementary Note 4, in which the degree of the degradation index of the area is a representative level representing the degradation index of the area determined based on an average value of the degradation index levels of road sections in the area.

[Supplementary Note 9]

The degradation display system according to any one of Supplementary Notes 1 to 8, in which the display control means superposes and displays, for each area, the degradation information based on the degradation index by using at least one of a color, a transmittance, and a thickness of a frame line partitioning the area corresponding to the degree of the degradation index of the road section in the area when the scale of the map is small, and the display control means superposes and displays, for each road section, the degradation information based on the degradation index by using at least one of a color, a transmittance, and a shape of an arrow indicating a road section when the scale of the map is large.

[Supplementary Note 10]

The degradation display system according to any one of Supplementary Notes 3 to 9, in which the display control means superposes and displays, on the road image, the degradation information based on the degradation index of the road image by using at least one of a color, a transmittance, a shape, a size, and an angle with respect to a road of an arrow indicating a traveling direction in a road section.

[Supplementary Note 11]

The degradation display system according to any one of Supplementary Notes 1 to 9, in which the display control means superposes and displays information including a presence of a pot hole, a degradation type, or a degradation factor on the area or the road section.

[Supplementary Note 12]

A degradation display method including:

acquiring a degradation index indicating a degradation state of a road section;

changing display of a map in accordance with a display range and a scale of the map, and superposing and displaying degradation information based on the degradation index in an area on the map or the road section in the area;

superposing and displaying, for each area, the degradation information based on the degradation index in a display form corresponding to a degree of the degradation index of the area when the scale of the map is small; and superposing and displaying, for each road section, the degradation information based on the degradation index in a display form corresponding to a degree of the degradation index of the road section when the scale of the map is large.

[Supplementary Note 13]

A program causing a computer to perform:

acquiring a degradation index indicating a degradation state of a road section;

changing display of a map in accordance with a display range and a scale of the map, and superposing and displaying degradation information based on the degradation index in an area on the map or the road section in the area;

superposing and displaying, for each area, the degradation information based on the degradation index in a display form corresponding to a degree of the degradation index of the area when the scale of the map is small; and superposing and displaying, for each road section, the degradation information based on the degradation index in a display form corresponding to a degree of the degradation index of the road section when the scale of the map is large.

REFERENCE SIGNS LIST 5 road management system
10 degradation display system
11 acquisition unit
12 display control unit
21 map information storage unit
22 road inspection data storage unit
30 degradation diagnosis system

What is claimed is:

1. A degradation display system comprising:
at least one memory configured to store instructions; and
at least one processor configured to execute the instructions to perform:
   acquiring a degradation index indicating a degradation state of a road section;
   changing display form of a map in accordance with a display range and a scale of the map; and
   superimposing degradation information on the map, the degradation information based on the degradation index of an area on the map or the road section in the area, wherein
the superimposing includes:
   superimposing, for each area, the degradation information in a display form corresponding to a degree of the degradation index of the area in a case that the map is at a first scale, and
   superimposing, for each road section, the degradation information in a display form corresponding to a degree of the degradation index of the road section in a case that the map is at a second scale larger than the first scale.

2. The degradation display system according to claim 1, wherein the at least one processor is further configured to execute the instructions to perform:
   determining the degree of the degradation index of the area based on a degradation index of the road section in the area.

3. The degradation display system according to claim 1, wherein the at least one processor is further configured to execute the instructions to perform:
   displaying a road image of the road section, and superimposing the degradation information on the road image in a display form corresponding to the degradation index of the road image, the degradation information based on the degradation index of the road image.

4. The degradation display system according to claim 1, wherein the at least one processor is further configured to execute the instructions to perform:
   determining the degree of the degradation index of the area based on at least one degradation index level of each degradation index.

5. The degradation display system according to claim 4, wherein
   the degree of the degradation index of the area is a representative level representing the degradation index of the area, the representative level determined based on the degradation index level for each road section in the area.

6. The degradation display system according to claim 4, wherein
the degree of the degradation index of the area is a representative level representing the degradation index of the area, the representative level determined based on a ratio of the degradation index level that is highest for the degradation index of each road section.

7. The degradation display system according to claim 4, wherein
the degree of the degradation index of the area is a representative level of the degradation index of the area, the representative level determined based on a ratio of the representative level for each road section in the area.

8. The degradation display system according to claim 1, wherein the at least one processor is further configured to execute the instructions to perform:
superimposing, for each area, the degradation information on the map by using at least one of a color, a transmittance, and a thickness of a frame line partitioning the area corresponding to the degree of the degradation index of the road section in the area in a case that the map is at the first scale, and
superimposing, for each road section, the degradation information on the map by using at least one of a color, a transmittance, and a shape of an arrow indicating a road section in a case that the map is at the second scale larger than the first scale.

9. The degradation display system according to claim 3, wherein the at least one processor is further configured to execute the instructions to perform:
superimposing the degradation information on the road image by using at least one of a color, a transmittance, a shape, a size, and an angle with respect to a road of an arrow indicating a traveling direction in a road section, the degradation information based on the degradation index of the road image.

10. The degradation display system according to claim 1, wherein the at least one processor is further configured to execute the instructions to perform:
superimposing information on the map, the information including a presence of a pot hole, a degradation type, or a degradation factor on the area or the road section.

11. A degradation display method comprising:
acquiring a degradation index indicating a degradation state of a road section;
changing display form of a map in accordance with a display range and a scale of the map;
superimposing degradation information on the map, the degradation information based on the degradation index of an area on the map or the road section in the area;
superimposing, for each area, the degradation information in a display form corresponding to a degree of the degradation index of the area in a case that the map is at a first scale; and
superimposing, for each road section, the degradation information in a display form corresponding to a degree of the degradation index of the road section in a case that the map is at a second scale larger than the first scale.

12. A non-transitory recording medium that stores a program causing a computer to perform:
acquiring a degradation index indicating a degradation state of a road section;
changing display form of a map in accordance with a display range and a scale of the map;
superimposing degradation information on the map, the degradation information based on the degradation index of an area on the map or the road section in the area;
superimposing, for each area, the degradation information in a display form corresponding to a degree of the degradation index of the area in a case that the map is at a first scale; and
superimposing, for each road section, the degradation information in a display form corresponding to a degree of the degradation index of the road section in a case that the map is at a second scale larger than the first scale.

13. The degradation display system according to claim 4, wherein
the degree of the degradation index of the area is a representative level representing the degradation index of the area, the representative level determined based on an average value of the degradation index levels of each road section in the area.

* * * * *